May 29, 1956  P. A. METCALF  2,747,449
TOOL FOR INSTALLING INSERTS
Filed Aug. 26, 1952
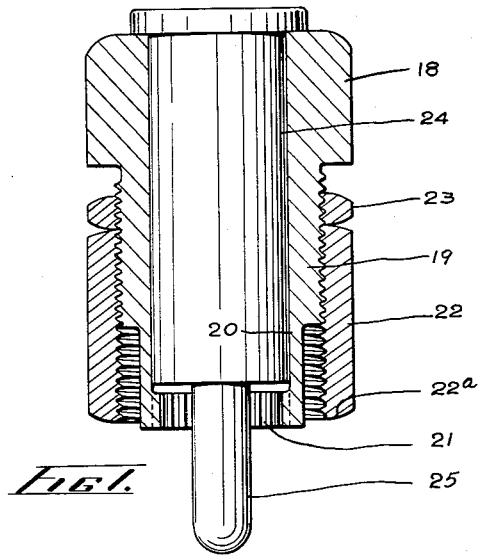
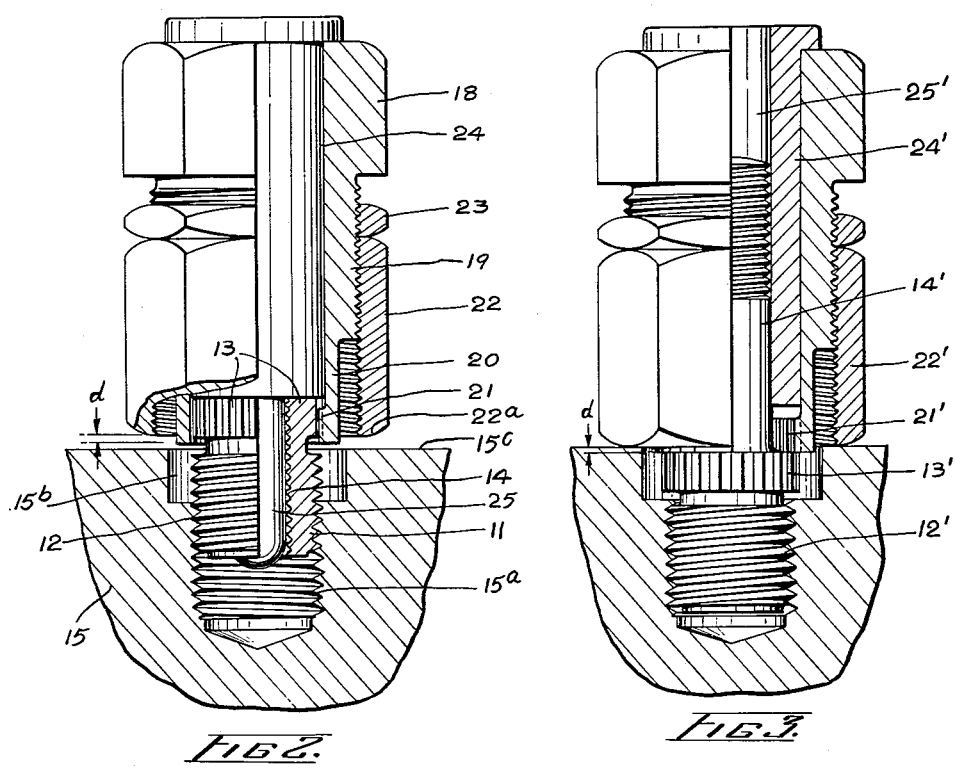
INVENTOR
P. A. METCALF
PER
ATTORNEY United States Patent Office 2,747,449
Patented May 29, 1956

2,747,449
TOOL FOR INSTALLING INSERTS

Philip Armitage Metcalf, Malton, Ontario, Canada, assignor to A. V. Roe Canada Limited, Malton, Ontario, Canada, a corporation Application August 26, 1952, Serial No. 306,387

10 Claims. (Cl. 81—121)

This invention relates to an improved tool for installing threaded inserts such as the well known "Rosan" inserts which are described in U. S. Patents Nos. 2,400,318 and 2,550,867, and it relates more particularly to an improved tool for installing such inserts to a predetermined depth with respect to the surface of the surrounding parent material.

The type of insert referred to above is used extensively when it is desired to secure a bolt or screw in relatively soft material and where frequent removal and replacement of the bolt is contemplated. The insert is made of hard material and is threaded into the soft parent material, and then the bolt is threaded into the insert and is in contact with only the hard material of the insert, so that no wear takes place on the threads of the parent material. The insert is prevented from rotating with the bolt by means of a locking collar which is driven into a counterbore in the parent material around the outer end of the insert.

With this type of construction it is often important that the insert should not project above the surface of the parent material since it would then interfere with parts which are to be tightened down against the parent material. It is therefore desirable to install the insert with its outer end at a predetermined small distance below the surface of the parent material.

U. S. Patent No. 2,550,866 shows a tool hitherto used for the purpose of installing inserts to a predetermined depth. With this tool there is a threaded engagement between the tool and the insert, and the relative axial positions of the tool and the insert are thereby fixed. Threading of the insert into the parent material is stopped when a portion of the tool engages the surface of the parent material, and it is then necessary to disengage the tool from the insert by a turning motion, leaving the insert in the desired position in the parent material. Where a considerable number of inserts are to be installed much time is lost in engaging and disengaging the tool and the insert, and it is therefore an object of the invention to provide an improved tool for rapidly installing inserts of the type described.

It is a further object of the invention to provide a tool which can be adjusted to install threaded inserts at varying depths in the parent material, and which can be adjusted for wear of the tool or variations in the inserts being installed.

Other objects and advantages will become apparent during the course of the following description.

In the accompanying drawings, in which like reference characters designate corresponding parts throughout the several views:

Figure 1 is a longitudinal sectional view of a tool constructed according to the invention for installing a socket type of insert;

Figure 2 is a partly sectional view of the tool of Figure 1 being used to install a socket type of insert; and Figure 3 is a partly sectional view of a similar tool being used to install a stud type of insert.

Referring to Figure 2, a conventional socket type of insert 11 is provided with a threaded portion 12 and a longitudinally splined collar 13. It has a hole 14 drilled and tapped centrally along its entire length. The threaded portion 12 engages a tapped hole 15a in the parent metal 15. When the insert is installed in its final position in the parent material, the collar 13 is located in a counterbore 15b coaxial with the threaded hole 15a, the upper end of the insert being below the surrounding surface 15c of the parent material by a small distance, and the collar being held by a conventional locking ring (not shown). The locking ring fits in the counterbore 15b and is longitudinally splined externally and internally to engage the walls of the counterbore and the splines in the collar 13 respectively.

The tool shown in Figures 1 and 2 consists of a tubular body or shank having a hexagon head 18 to which torque may be applied, an externally threaded intermediate portion 19, and a spigot or driving portion 20 of a diameter which can be accommodated with some clearance in the counterbore 15b. Longitudinal splines 21 are provided internally of the spigot 20 at the lower end. A nut 22, and a locking nut 23 are threaded onto the intermediate portion 19. A plug 24 fits within the tubular body and carries a pilot 25 of reduced diameter which projects beyond the splined end of the spigot 20.

To use the tool to install an insert, the nut 22 is adjusted by turning it along the threaded portion 19 so that the observable axial distance between the lower end 22a of the nut 22 and the lower end of the splines 21 is equal to the desired depth $d$ of the upper end of the insert 11 below the surface 15c of the parent material when the insert is installed. The nut 22 is then locked in place by means of the locking nut 23. The insert to be installed is then placed in the lower end of the tool with the splined collar 13 engaging the splines 21 in the spigot, the upper end of the insert abutting against the lower end of the plug 24 and the pilot 25 projecting into the hole 14 of the insert to ensure correct alignment. The insert is then threaded into the tapped hole 15a by turning the tool by means of a wrench applied to the head 18. Downward axial movement of the tool is arrested when the lower end 22a of the nut 22 comes into contact with the surface 15c of the parent material. Further rotation of the tool permits the insert to turn and to proceed axially into the tapped hole 15a as long as the splined collar 13 is engaged with the splines 21. When the upper end of the collar 13 is rotated to the depth $d$ below the surface 15c, the insert disengages itself from the splines 21, so that rotation of the tool has no further effect upon the insert. The tool is free of the insert and can be removed, and a locking ring is then forced into position in the counterbore 15b. It is not normally necessary to vary the adjustment of the nut 22 except to compensate for wear of the end portions of the splines 21 after considerable use.

When the axis of the tool is horizontal the pilot 24 assists in holding the insert in engagement with the tool prior to installation of the insert into the parent material. Furthermore, the pilot keeps the tool axis coaxial with the insert, thus ensuring correct engagement of the surface 22a of the nut with the surface 15c of the parent material.

A tool for use with a stud type of insert is shown in Figure 3. The stud type of insert has a threaded portion 12' and a longitudinally splined collar 13' and is therefore similar to the insert 11 except that instead of a tapped hole 14 it has a stud 14' projecting from its upper end. The tool for use with the stud type of insert has a tubular body with internal splines 21' at its lower end adapted to engage the splined collar 13', an adjustable nut 22', and a plug 24' fitting within the tubular body, but instead of a pilot such as 25 the plug 24' has an axial pilot hole 25' which receives the stud 14, when the insert is fitted into the tool. The tool and insert in Figure 3 are shown in the position where the insert has just moved out of engagement with the splines 21' and is ready to be locked in position by a locking ring when the tool is removed.

It is to be understood that the forms of the invention herewith shown and described are to be taken as preferred examples of the same and that various changes in the shape, size and arrangement of the parts may be resorted to without departing from the function of the invention or the scope of the subjoined claims.

What I claim as my invention is:

1. A tool for installing an insert of the type having a threaded portion adapted to be screwed axially into a hole in parent material and also having a collar with external locking formations thereon, said tool comprising a unitary shank having internal formations engageable with such locking formations in torque-transmitting relationship, the shank being slidable axially of an insert and out of engagement with such locking formations of an insert, means on the shank whereby torque may be applied to the shank, the shank having a threaded portion, a nut threadably engaging the threaded portion of the shank for movement axially of the shank, and means for locking the nut in predetermined axial relationship to the shank, the nut being engageable with a surface of such parent material as an insert is advanced axially into its hole to limit axial movement of the shank when engaged with such an insert whereby further application of torque to the shank causes such an insert to advance into its hole until its locking formations become disengaged from the shank.

2. A tool for installing an insert of the type having a threaded portion adapted to be screwed axially into a hole in parent material and also having axially disposed splines, said tool comprising a unitary shank having axially disposed splines complementary to such splines of an insert and engageable therewith in torque-transmitting relationship, the splined shank being slidable axially of such a splined insert and out of engagement with such an insert, means on the shank whereby the shank and an insert may be turned so as to advance such an insert axially into its hole, the shank having a threaded portion, a nut threadably engaging the threaded portion of the shank for movement axially of the shank, and means for locking the nut in predetermined axial relationship to the shank, the nut being engageable with a surface of such parent material as an insert is advanced axially into its hole so as to limit axial movement of the shank when engaged with an insert.

3. A tool for insulating an insert of the type having a threaded portion adapted to be screwed axially into a hole in parent material and also having locking formations thereon, said tool comprising a unitary shank having locking formations engageable with such locking formations of an insert in torque-transmitting relationship, the shank being slidable axially of an insert and out of engagement with such locking formations of such an insert, means on the shank whereby torque may be applied to the shank thus transmitting torque to an insert through the locking formations of the shank so as to screw such an insert axially into its hole, the shank having a threaded portion, a nut threadably engaging the threaded portion of the shank for movement axially of the shank, and means for locking the nut in predetermined axial relationship to the shank, the nut being engageable with a surface of such parent material as an insert is advanced axially into its hole so as to limit axial movement of the shank when engaged with such an insert whereby further application of torque to the shank causes such an insert to advance into its hole until its locking formations become disengaged from the shank.

4. A tool for installing an insert of the type having threads adapted to be screwed axially into a hole in parent material, such insert also having locking formations thereon, said tool comprising an externally threaded portion, an insert-driving portion, the driving portion having locking formations engageable with such locking formations of an insert in torque-transmitting relationship, the locking formations of the driving portion permitting an insert to be engaged and disengaged therewith by axial movement of such an insert, the driving portion when engaged with an insert being coaxial therewith and being fixed in its axial position relative to the externally threaded portion, an internally threaded nut encircling the driving portion and threadably engaging the externally threaded portion for adjustment of the nut axially relative to the driving portion, means for locking the nut in predetermined fixed axial relationship with respect to the externally threaded portion and thus with respect to the driving portion when engaged with an insert, and means for applying torque to the driving portion thus transmitting torque to such locking formations of an insert so as to screw such an insert axially into its hole and so as to advance the driving portion axially towards such parent material, the nut being engageable with a surface of such parent material as such an insert is advanced axially into its hole thus stopping the axial movement of the driving portion whereby further application of torque causes such an insert to advance into its hole until its locking formations become disengaged from the driving portion, the fixed relative axial positions of the nut and driving portion determining the distance that such an insert is screwed into such parent material by the tool.

5. A tool for installing an insert of the type having threads adapted to be screwed axially into a hole in parent material, such insert also having locking formations thereon, said tool comprising a threaded portion and an insert-driving portion, said portions having a common axis, the driving portion having locking formations engageable with such locking formations of an insert in torque-transmitting relationship, the locking formations of the driving portion permitting an insert to be engaged and disengaged therewith by axial movement of such an insert, means for applying torque to the driving portion about the axis thereof thus transmitting torque to such locking formations of an insert so as to screw such an insert axially into its hole and so as to move the driving portion towards such parent material, and adjustable stop means engageable with a surface of such parent material as an insert is advanced axially into its hole, the adjustable stop means comprising a nut threadably engaging the threaded portion of the tool for movement of the nut in the axial direction of the driving portion to adjust the stop means to a desired position, the driving portion when engaged with an insert being in a fixed axial position relative to the threaded portion of the tool whereby the stop means when adjusted as desired occupy a fixed axial position relative to the driving portion, the stop means upon engagement with a surface of such parent material thus stopping axial movement of the driving portion towards such parent material whereby further application of torque causes such an insert to advance into its hole until its locking formations become disengaged from the driving portion, the fixed relative axial positions of the stop means and driving portion determining the distance that such an insert is advanced into its hole by the tool.

6. A tool as claimed in claim 5 for installing an insert having an axial hole, the tool having a smooth sided cylindrical pilot which extends into such axial hole of an insert during said transmission of torque.

7. A tool as claimed in claim 5 for installing an insert having a stud adapted to protrude from a surface of parent material when such an insert is installed in such parent material, the tool having a smooth sided cylindrical pilot hole into which such stud of an insert extends during said transmission of torque.

8. A tool as claimed in claim 5 for installing an insert the locking formations of which are axially disposed splines, in which the locking formations of the tool are axially disposed splines complementary to such splines of an insert.

9. A tool as claimed in claim 8, in which the splines of the tool have one end at which the disengagement of such splines of an insert from the driving portion occurs, and the adjustable stop means have an end at which the engagement of the stop means with such a surface of such parent material occurs, the axial distance between said ends being observable on the tool and indicating the distance that such an insert is advanced into its hole by the tool.

10. An elongated tool for installing an insert of the type having threads adapted to be screwed axially into a hole in parent material and also having axially disposed external splines, said tool comprising a unitary shank having an insert driving portion at one end and having an externally threaded portion spaced from said end, the driving portion and threaded portion having a common axis, and means at the opposite end of the shank for applying torque to the driving portion about said axis, the driving portion having axially disposed internal splines complementary to and engageable with such external splines of an insert in torque-transmitting relationship, the driving portion when engaged with an insert being coaxial therewith and being slidable axially out of engagement with such external splines of an insert, application of torque to the driving portion when engaged with an insert causing transmission of torque to such external splines of an insert so as to screw such an insert axially into its hole, a first nut having internal threads at one end threadably engaging the externally threaded portion of the shank for adjustment of the nut axially relative to the driving portion, the nut at its other end encircling the driving portion, a second internally threaded lock nut threadably engaging the externally threaded portion of the shank for holding the first nut in predetermined axial relationship to the driving portion, said other end of the first nut being engageable with a surface of such parent material as an insert is advanced axially into its hole so as to limit axial movement of the driving portion when engaged with an insert whereby further application of torque causes such an insert to advance into its hole until its splines become disengaged from the driving portion.

References Cited in the file of this patent

UNITED STATES PATENTS

| | | |
|---|---|---|
| 793,503 | Bousser | June 27, 1905 |
| 1,009,248 | Jenkins et al. | Nov. 21, 1911 |
| 1,030,732 | Jenkins | June 25, 1912 |
| 1,160,064 | Gates | Nov. 9, 1915 |
| 1,793,477 | German et al. | Feb. 24, 1931 |
| 2,371,622 | Hankins | Mar. 20, 1945 |
| 2,466,546 | Huelster | Apr. 5, 1949 |
| 2,550,866 | Rosan | May 1, 1951 |
| 2,618,189 | Almes | Nov. 18, 1952 |
| 2,670,644 | Du Sell | Mar. 2, 1954 |